United States Patent [19]

Idel et al.

[11] 4,362,864

[45] Dec. 7, 1982

[54] PROCESS FOR THE PREPARATION OF POLYARYLENE SULPHIDES

[75] Inventors: Karsten Idel; Dieter Freitag; Ludwig Bottenbruch, all of Krefeld; Josef Merten, Korschenbroich, all of Fed. Rep. of Germany

[73] Assignee: Bayer Aktiengesellschaft, Leverkusen, Fed. Rep. of Germany

[21] Appl. No.: 263,421

[22] Filed: May 14, 1981

[30] Foreign Application Priority Data

May 23, 1980 [DE] Fed. Rep. of Germany ....... 3019732

[51] Int. Cl.³ ............................................. C08G 75/14
[52] U.S. Cl. .................................................. 528/388
[58] Field of Search ........................................ 528/388

[56] References Cited

U.S. PATENT DOCUMENTS

4,038,262  7/1977  Edmonds, Jr. ...................... 528/388
4,038,263  7/1977  Edmonds, Jr. et al. ............. 528/388

OTHER PUBLICATIONS

Periodic Table of the Elements, E. H. Sargent & Co. Chicago, Ill. 1962.

Primary Examiner—Melvyn I. Marquis
Attorney, Agent, or Firm—Connolly and Hutz

[57] ABSTRACT

A process for preparing a polyarylene sulphide which comprises reacting
(a) dihalogenobenzene consisting of 50 to 100 mol % of a compound of the formula

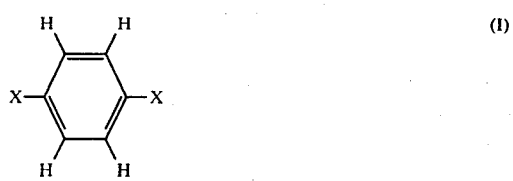

(I)

or a compound of the formula

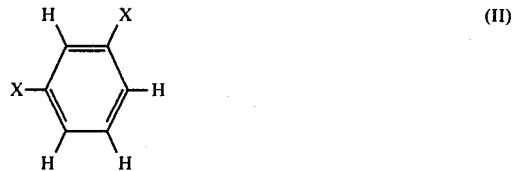

(II)

or a mixture thereof and of 0 to 50 mol % of a compound of the formula

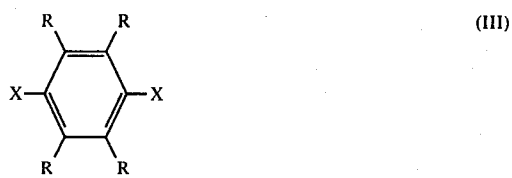

(III)

wherein X is halogen and each R is selected from the group consisting of hydrogen, alkyl having 1 to 20 carbon atoms, cycloalkyl having 5 to 20 carbon atoms, aryl having 6 to 24 carbon atoms, alkaryl having 7 to 24 carbon atoms and aralkyl having 7 to 24 carbon atoms with the proviso that at least one R is other than hydrogen and (b) 0 to 3.0 mol % based on the dihalogenobenzene content of a polyhalogeno aromatic of the formula $ArX_n$ (IV)

wherein Ar is an aromatic or heterocyclic radical with 6 to 24 carbon atoms having at least 3 free valencies, X is halogen and n is ≧ 3 with
(c) an alkyl metal sulphide in
(d) a polar solvent in the presence of
(e) 0.05–2.0 mol of alkali metal fluoride per mol of alkali metal sulphide, for a polycondensation time of up to 30 hours and at a polycondensation temperature of between 160° and 295° C., the molar ratio of (a) to (c) being in the range from 0.85:1 to 1.15:1 and the molar ratio of (c) to (d) being in the range of from 1:2 to 1:15.

8 Claims, No Drawings

PROCESS FOR THE PREPARATION OF POLYARYLENE SULPHIDES

Polyarylene sulphides are known in principle (see, for example, U.S. Pat. No. 2,538,941 and U.S. Pat. No. 2,513,188). They can be prepared without diluents, from the corresponding halogenoaromatics and alkali metal sulphides or alkaline earth metal sulphides.

The preparation by means of alkali metal sulphides can furthermore be carried out also using polar solvents (in this context, see, for example, U.S. Pat. No. 3,354,129 and DOS (German Published No.) 1,468,782), it being possible, if appropriate, also to use copper catalysts.

According to DE-OS (German Published No.) 2,453,749 and U.S. Pat. No. 3,919,177, alkali metal carboxylates are used as catalysts for the preparation of polyarylene sulphides. Amides are used as solvents and inorganic bases are used to activate the sulphur donors.

According to DE-OS (German Published No.) 2,623,363 and U.S. Pat. No. 4,038,261, lithium chloride or lithium carboxylate are employed as catalysts for the preparation of arylene sulphide polymers. N-Methylpyrrolidone and alkali metal hydroxides complete the catalyst system.

Catalysts which are employed for the preparation of polyphenylene sulphide are alkali metal carbonates in combination with alkali metal carboxylates, according to U.S. Pat. No. 4,038,259, lithium halides according to U.S. Pat. No. 4,038,263, and lithium carbonates according to U.S. Pat. No. 4,039,518.

According to DE-OS (German Published No.) 2,623,362 and U.S. Pat. No. 4,038,262, lithium halides or alkali metal carboxylates are used as catalysts for the preparation of arylene sulphide polymers. N-Methylpyrrolidone and alkali metal hydroxides complete the catalyst system.

According to DE-OS (German Published No.) 2,623,333 and U.S. Pat. No. 4,064,114, lithium acetate is used as the catalyst for the preparation of arylene sulphide polymers. N-Alkylpyrrolidones and, if appropriate, alkali metal hydroxides and/or alkali metal carbonates, as bases, complete the catalyst system.

According to DE-OS (German Published No.) 2,817,731 and U.S. Pat. No. 4,116,947, sodium carboxylates in the presence of defined amounts of water are used as catalysts for the preparation of branched arylene sulphide polymers.

In contrast, the present invention relates to a process for the preparation of polyarylene sulphides, which can optionally be branched, from (a) dihalogenobenzenes which consist of 50 to 100 mol% of compounds of the formula I or II or of mixtures thereof, but preferably of compounds of the formula I

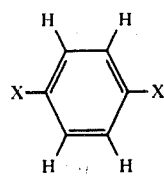

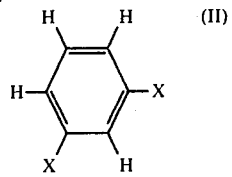

and of 0 to 50 mol% of dihalogenobenzenes of the formula III

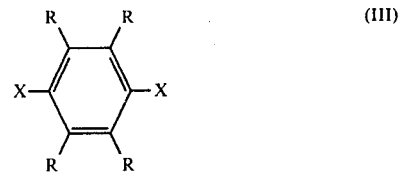

wherein

X is fluorine, chlorine, bromine or iodine, preferably chlorine or bromine, and the radicals R are identical or different and can be hydrogen, $C_1$–$C_{20}$-alkyl, $C_5$–$C_{20}$-cycloalkyl, $C_6$–$C_{24}$-aryl, $C_7$–$C_{24}$-alkaryl or $C_7$–$C_{24}$-aralkyl, and/or two radicals R can be linked to form an aromatic or heterocyclic ring, but always at least one R is other than hydrogen, and (b) 0 to 3.0 mol%, relative to the dihalogenobenzene content, of a polyhalogenoaromatic of the formula IV $$ArX_n \qquad (IV)$$

wherein

Ar is any desired aromatic or heterocyclic radical with 6 to 24 C atoms and at least 3 free valencies, X has the same meaning as in the case of formula I, II and III and $n \geq 3$, and an (c) alkali metal sulphide, preferably sodium sulphide or potassium sulphide or a mixture thereof, preferably in the form of the hydrates or aqueous mixtures, if appropriate together with alkali metal hydroxides, in a (d) polar solvent, preferably an amide or lactam, in particular a N-alkyllactam, the molar ratio of (a) to (c) being in the range from 0.85:1 to 1.15:1, preferably 0.95:1 to 1.05:1 and that of (c) to (d) being in the range from 1:2 to 1:15, with a polycondensation time of up to 30 hours, preferably of 0.2 to 8 hours, and at a polycondensation temperature of between 160° and 295° C., preferably between 190° and 275° C., which is characterised in that the reaction is carried out in the presence of 0.05–2.0 mols, preferably 0.1–1.0 mol, per mol of alkali metal sulphide, of alkali metal fluorides, in particular of a sodium fluoride or potassium fluoride or a mixture thereof, it also being possible for the alkali metal fluorides to be employed in the form of their hydrates or aqueous mixtures and one or more dehydration stages being carried out before the addition of the dihalogenobenzenes.

Polyarylene sulphides with higher intrinsic viscosities or limiting viscosity values and a lower melt index are obtained by the process according to the invention than by an analogous process in which no alkali metal fluorides are also used.

The alkali metal sulphides used are preferably sodium sulphide and potassium sulphide ($Na_2S$ or $K_2S$) or mixtures thereof, in general as hydrates or in mixtures with water.

The alkali metal fluorides according to the invention are likewise preferably employed in the form of their hydrates or in mixtures with water, sodium fluoride and/or potassium fluoride particularly preferably being employed.

It is of course also possible to neutralise the corresponding alkali metal hydroxides directly, if appropriate as aqueous mixtures, in the reaction solution with hydrofluoric acid in the desired stoichiometric ratio, a particularly homogeneous distribution of the fluorides formed according to the invention being achieved.

It is possible to employ either one alkali metal fluoride or several different alkali metal fluorides.

The alkali metal sulphides can likewise be obtained from hydrogen sulphide or the alkali metal bisulphides and corresponding stoichiometric amounts of alkali metal hydroxides, by neutralisation within or outside the reaction solution. The use of additional alkali metal hydroxides is recommended even when pure alkali metal sulphides are used in order to neutralise alkali metal bisulphides which are frequently present as concomitant substances.

Examples of the p-dihalogenobenzenes of the formula I which can be employed according to the invention are: p-difluorobenzene, p-dichlorobenzene, p-dibromobenzene, p-diiodobenzene, 1-fluoro-4-chlorobenzene, 1-fluoro-4-bromobenzene, 1-chloro-4-bromobenzene, 1-chloro-4-iodobenzene and 1-bromo-4-iodobenzene. They can be employed by themselves or as mixtures with one another.

Examples of m-dihalogeno benzenes of the formula II are: m-difluorobenzene, m-dichlorobenzene, m-dibromobenzene, 1-chloro-3-bromobenzene, 1-chloro-3-iodobenzene and 1-bromo-3-iodobenzene. They can be employed by themselves or as mixtures with one another. Mixtures of the p-dihalogenobenzenes and the m-dihalogenobenzenes can likewise be used.

Examples of the p-dihalogenobenzenes of the formula III to be employed according to the invention are 2,5-dichlorotoluene, 2,5-dichloroxylene, 1-ethyl-2-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene and 1,4-dichloroanthraquinone. They can be employed by themselves or as mixtures with one another.

Examples of the polyhalogenoaromatics of the formula IV to be employed according to the invention are: 1,2,3-trichlorobenzene, 1,2,4-trichlorobenzene, 1,2,4-tribromobenzene, 1,2,4-triiodobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene, 2,2',4,4'-tetrachlorobiphenyl and 1,3,5-trichloro-triazine.

In general, any polar solvent which ensures sufficient solubility of the organic and inorganic reactants under the reaction conditions can be employed for the reaction. However, lactams and amides are preferably employed, N-alkyllactams being particularly preferred.

Lactams in the context of the present invention are those of aminoacids which have 3 to 5 C atoms and can optionally carry, on the carbon skeleton, substituents which are inert under the reaction conditions, such as, for example, an alkyl radical with 1 to 5 C atoms.

N-Alkyllactams in the context of the present invention are defined in the same manner as the lactams according to the invention, but additionally carry, on the nitrogen atom, an alkyl radical with 1 to 3 C atoms.

Amides in the context of the invention are those of carboxylic acids which have 1 to 5 C atoms, and preferably those of carboxylic acids which have 1 to 5 C atoms and carry, on the amide nitrogen, two alkyl radicals with 1 to 3 C atoms.

Examples of possible solvents are: dimethylformamide, dimethylacetamide, caprolactam, N-methylcaprolactam, N-ethylcaprolactam, N-isopropylcaprolactam, N-methyl-2-pyrrolidone, N-ethyl-2-pyrrolidone, N-isopropyl-2-pyrrolidone, N-methyl-3-methyl-2-pyrrolidone, N-methyl-5-methyl-2-pyrrolidone, N-methyl-3,4,5-trimethyl-2-pyrrolidone, N-methyl-2-piperidone, N-ethyl-2-piperidone, N-methyl-6-methyl-2-piperidone, N-methyl-3-ethyl-2-piperidone, N-methyl-2-oxohexamethyleneimine and N-ethyl-2-oxohexamethyleneimine.

Mixtures of the above solvents can also be chosen.

In the process according to the invention, the p-dihalogenobenzene, or the m-dihalogenobenzene or mixtures thereof, but preferably the p-dihalogenobenzene, if appropriate with a polyhalogenoaromatic of the formula IV, the alkali metal sulphide, if appropriate with an alkali metal hydroxide, and the alkali metal fluorides can in principle be mixed in any form, and reacted, in the polar solvent to be employed according to the invention. However, it is advantageous for at least most of the water, which can be present in the form of water of hydration of the alkali metal sulphides and alkali metal fluorides and/or in the free form as a mixing component of aqueous solutions of the sulphides and fluorides to be employed according to the invention, to be removed before addition to the reaction of the dihalogenobenzene.

The dehydration can be carried out, for example, by distilling off the water from the reaction solution. In a preferred reaction procedure, the N-alkyllactam is initially introduced into the reaction vessel together with the alkali metal fluorides according to the invention and the water of hydration or mixing water is removed in a first dehydration stage. The desired amounts of alkali metal sulphide are then added and a second dehydration stage is carried out if necessary. These two dehydration stages can also be combined to form one dehydration step. Thereafter, the dihalogenobenzene and, if appropriate, the polyhalogeno compound of the formula IV are added and the actual polymer reaction is started, with further increase in the temperature.

In the dehydration stages, the temperature should be increased slowly, in order to prevent frothing of the reaction mixture.

As soon as the boiling point of the solvent has been reached, the actual polymer reaction can be started.

The reaction temperature of the polycondensation according to the invention is as a rule in the range from 160° C. to 295° C., preferably in the range from 190° to 275° C. The reaction time can be up to 30 hours, but is preferably between 0.2 and 8 hours. It is advantageous to increase the reaction temperature stepwise during this period.

The dihalogenobenzene and the alkali metal sulphide are as far as possible reacted in equimolar proportions.

The molar ratio of dihalogenobenzene/alkali metal sulphide is accordingly preferably in the range from 0.95:1 to 1.05:1. However, this can be extended to the range from 0.85:1 to 1.15:1.

Depending on the experimental conditions, the polyhalogenoaromatics of the formula IV to be employed according to the invention can be added in an amount of up to several mol%, relative to the amount of dihalogenobenzene, but as a rule an amount of 0 to 3.0 mol%, preferably 0.1 to 3.0 mol%, relative to the amount of dihalogenobenzene, will be sufficient.

The amount of solvent can be chosen within a wide range, but is in general 2 to 15 mols per mol of alkali metal sulphide.

The amount of alkali metal hydroxide is chosen according to the amounts of alkali metal bisulphide in the technical grade alkali metal sulphide. It can be up to 0.8 per mol of alkali metal sulphide, but an even higher amount can be chosen if necessary.

Alkali metal hydroxides which are employed are, for example, lithium hydroxide, sodium hydroxide and potassium hydroxide, or mixtures thereof. Those compounds which regenerate alkali metal hydroxides by a hydrolysis step in the combination with water can optionally also be used for the same purpose.

The amount of alkali metal fluorides according to the invention can be varied according to the experimental conditions, but is in general between 0.05 and 2 mols, preferably 0.1 and 1.0 mol, per mol of alkali metal sulphide.

The reaction mixture can be worked up in various ways.

The polyarylene sulphide can be separated off from the reaction solution directly, or only after the addition of, for example, water and/or dilute acids, by customary procedures, for example by filtration or by centrifuging.

The filtration is in general followed by washing with water, in order to remove inorganic constituents, such as, for example, the alkali metal sulphides or the fluorides according to the invention, which can adhere to the polymers.

The product can, of course, also be washed or extracted with other wash liquids, it being possible to carry out such an operation in addition to or after the above washing.

The polymer can also be isolated by stripping off the solvent from the reaction chamber and subsequently washing the residue as described above.

Compared with the non-catalysed preparation of polyarylene sulphides, polyarylene sulphides with a higher limiting viscosity value and a lower melt index are obtained by the process according to the invention.

In German Offenlegungsschriften (German Published Nos.) 2,623,333 and 2,623,363, the inherent viscosity in 1-chloro-naphthalene at 206° C. and at a concentration of 0.4 g of polymer/100 ml of solvent is measured as a reference value for the molecular weight. However, the danger of the formation of associates is relatively high in this temperature and concentration range. The limiting viscosity value [$\eta$], which is obtained from measurements of inherent viscosities with extrapolation of the concentration to zero, is thus determined for characterisation of the polyarylene sulphides according to the invention.

$$[\eta] = \frac{1 \, n \, \eta_{rel}}{C} \text{ for } C \longrightarrow 0$$

The melt index of the polyarylene sulphides according to the invention, which is low in comparison with polyarylene sulphides obtained by a non-catalytic route, provides particular technological advantages. (The melt index is measured in accordance with the method of ASTM D 1238-70, using a weight of 5 kg and changing the temperature to 316° C., the value being expressed in g/10 minutes.)

The melt index of the polyarylene sulphides according to the invention is in the range from 1–2,000 g/10 minutes and can be reduced to within the range from 1–1,000 g/10 minutes by chemical branching (metering in 0.3–3.0 mol% of compounds of the formula IV, for example 1,2,4-trichlorobenzene) and/or chain-lengthening and branching by a heat treatment, which is carried out at temperatures of 200°–370° C. under nitrogen or in vacuo, if appropriate with preliminary crosslinking via air or the addition of oxygen, so that the resulting polyphenylene sulphides can be processed by extrusion, extrusion blow-moulding, injection-moulding or other customary processing techniques to give films, shaped articles or fibres which are used in the customary manner as automobile components, fittings, electrical components, such as switches, printed circuit boards, chemical-resistant components and equipment, such as pump housings and pump vanes, etching bath dishes, sealing rings, components for office machines and telecommunication equipment, and domestic appliances, valves, ballbearing components and the like.

The polyarylene sulphides according to the invention can also be mixed with other polymers or with pigments and fillers, such as, for example, graphite, metal powder, glass powder, quartz powder or glass fibres, or the additives customary for polyarylene sulphides, such as, for example, customary stabilisers or mould release agents, may be introduced.

EXAMPLE 1

This example describes, as a comparison example, the preparation of polyphenylene sulphide without the catalysis according to the invention (U.S. Pat. No. 3,354,129).

130 g (1.0 mol/60% pure material) of sodium sulphide ($Na_2S \times H_2O$) and 300 g of N-methyl-2-pyrrolidone were brought together in an autoclave provided with a stirrer. The mixture was flushed with nitrogen and warmed slowly to 202° C. A total of 29 ml of water thereby distilled off. The batch was then cooled down to about 160° C. and 147 g of p-dichlorobenzene in about 50 g of N-methyl-2-pyrrolidone were added. The reaction mixture was warmed, under an initial pressure of nitrogen of 2.5 bars, to 245° C. in the course of 30 minutes, during which the pressure rises to 10 bars, and this temperature is maintained for 3 hours. After cooling to room temperature, a grey solid is isolated and is subsequently subjected to careful washing with water in order to remove the concomitant inorganic substances.

The mixture is dried at 80° C. in vacuo and 100.3 g (93%) of poly-(p-phenylene sulphide) with the following characteristic data are obtained:
limiting viscosity value [$\eta$]: 10.2
melt index in g/10 minutes: 2,400

EXAMPLE 2

In the process according to the invention, an aqueous solution of potassium fluoride (KF) was employed:

55.3 g (0.94 mol) of potassium fluoride were dissolved in 168.8 g of water and the solution was added to 750 g of 1-methyl-2-pyrolidone.

The mixture was dehydrated under nitrogen by heating to 178° C. in the course of 5 hours, 173 ml of distillate containing 89% of water being obtained. 245.2 g of sodium sulphide trihydrate (about 60% pure) (1.950 mols) and 4.0 g of NaOH in 10 ml of H₂O were then added and the mixture was again dehydrated by heating at 200° C., a total of 204 ml of distillate containing 83% of water being collected.

After adding 275.6 g (1.875 mols) of p-dichlorobenzene in 200 g of 1-methyl-2-pyrrolidone, the reaction was started in an autoclave under an initial pressure of 50 bars and was conducted as follows:

1 hour at 205° C.: 54 bars in the course of 0.5 hour from 205° C. to 266° C.: 54 bars→65 bars 4 hours at 266° C.: 65 bars The batch was then poured into 2 l of water and the product was filtered off and washed until neutral.

Yield after drying: 195 g ≙ 96%
limiting viscosity [η]=14.8
melt index in g/10 minutes=1,120

EXAMPLE 3

The batch was reacted as in Example 2, but with half the amount of potassium fluoride (27.65 g ≙ 0.47 mol) and under a lower pressure.

Course of the reaction:
1 hour at 205° C.: 3 bars
in the course of 0.5 hour, from 205° C. to 266°: 13 bars
4 hours at 266° C.: 13.5 bars
Yield: 191.0 g ≙ 94.5 g
Limiting viscosity value [η]=13.9
Melt index in g/10 minutes=1,230

EXAMPLE 4

The batch was reacted as in Example 2, but with twice the amount of potassium fluoride (110.6 g of KF 1.875 mols) and under a higher pressure:
1 hour at 205: 206 bars
in the course of 0.5 hour, from 205° to 266° C.: 218 bars
4 hours at 266° C.: 218 bars
Yield: 199 g ≙ 98%
Limiting viscosity [η]=16.2
Melt index in g/10 minutes=980

EXAMPLE 5

This example was carried out as Example 2, but instead of potassium fluoride, the same molar amount of sodium fluoride (0.94 mol ≙ 39.4 g) was employed. The reaction was conducted as in Example 2.
Limiting viscosity value [η]=15.2
Melt index in g/10 minutes=1,060

EXAMPLE 6

46.97 g of hydrofluoric acid (40% strength) were slowly added dropwise to 750 g of N-methylpyrolidone and 75.2 g (0.94 mol) of 50% strength sodium hydroxide solution, whilst removing the heat of neutralisation. The mixture was then dehydrated by heating to 180° C. under nitrogen, 75.5 g of distillate with a water content of 85% being obtained. The further procedure for dehydrating sodium sulphide trihydrate and for adding p-dichlorobenzene, and the regulation of the temperature and pressure correspond to the statements in Example 2.

Limiting viscosity value [η]=15.6
Melt index in g/10 minutes=990

EXAMPLE 7

This example was carried out as Example 5, but 5.45 g=1.6 mol% (relative to the mols of p-dichlorobenzene) of 1,2,4-trichlorobenzene were employed, together with p-dichlorobenzene, as a branching component and the amount of sodium sulphide was increased from 254.7 g to 273.2 g (2.07 mols) because of the increased halogenoaromatic content (1.6 mol% of trichlorobenzene).

Limiting viscosity value [η]=18.2
Melt index in g/10 minutes=720

We claim:

1. A process for preparing a polyarylene sulphide which consists essentially of reacting
   (a) dihalogenobenzene consisting of 50 to 100 mol % of a compound of the formula

or a compound of the formula

or a mixture thereof and 0 to 50 mol % of a compound of the formula

wherein X is halogen and each R is selected from the group consisting of hydrogen, alkyl having 1 to 20 carbon atoms, cycloalkyl having 5 to 20 carbon atoms, aryl having 6 to 24 carbon atoms, alkaryl having 7 to 24 carbon atoms and aralkyl having 7 to 24 carbon atoms or two of said R groups are selected from the aforesaid group and the other two are linked together to form an aromatic or heterocyclic ring or two of said R groups are linked together to form an aromatic or heterocyclic ring and the other two R groups are also linked together to form an aromatic or heterocyclic ring with the proviso that at least one R is other than hydrogen and (b) 0 to 3.0 mol % based on the dihalogenobenzene content of a polyhalogeno aromatic compound of the formula $$ArX_n \qquad (IV)$$

wherein Ar is an aromatic or heterocyclic radical with 6 to 24 carbon atoms, X is halogen and n is $\geq 3$ with (c) an alkyl metal sulphide in
(d) a polar solvent in the presence of
(e) 0.05–2.0 mol of alkali metal fluoride per mol of alkali metal sulphide, said alkali metal fluoride being selected from the group consisting of sodium fluoride, potassium fluoride and mixtures thereof, for a polycondensation time of up to 30 hours and at a polycondensation temperature of between 160° to 295° C., the molar ratio of (a) to (c) being in the range from 0.85:1 to 1.15:1 and the molar ratio of (c) to (d) being in the range of from 1:2 to 1:15.

2. A process according to claim 1 wherein 50 to 100 mol % of a compound of formula I and 0–50 mol % of a compound of formula III are employed as component (a).

3. A process according to claim 1 wherein 100 mol % of a compound of formula I is employed as component (a).

4. A process according to claim 1 wherein the polycondensation time of 0.2 to 8 hours.

5. A process according to claim 1 wherein the polycondensation temperature is between 190° and 275° C.

6. A process according to claim 1 wherein the reaction is carried out in the presence of 0.1 to 1.0 mol of alkali metal fluoride per mole of alkali metal sulphide.

7. A process according to claim 1 wherein (d) is N-methylpyrolidone.

8. A process according to claim 1 wherein X is chlorine or bromine.

* * * * *